United States Patent
Moriwaki et al.

(10) Patent No.: US 12,169,541 B2
(45) Date of Patent: Dec. 17, 2024

(54) AUTHENTICATION SYSTEM AND AUTHENTICATION METHOD

(71) Applicant: Glory Ltd., Himeji (JP)

(72) Inventors: Sotaro Moriwaki, Himeji (JP); Shigenobu Nishida, Himeji (JP); Yuichi Fujita, Himeji (JP); Ayumi Kokubun, Himeji (JP)

(73) Assignee: GLORY LTD., Himeji (JP)

( * ) Notice: Subject to any disclaimer, the term of this patent is extended or adjusted under 35 U.S.C. 154(b) by 300 days.

(21) Appl. No.: 17/475,342

(22) Filed: Sep. 15, 2021

(65) Prior Publication Data
US 2022/0004612 A1  Jan. 6, 2022

Related U.S. Application Data

(63) Continuation of application No. PCT/JP2020/010452, filed on Mar. 11, 2020.

(30) Foreign Application Priority Data

Mar. 19, 2019 (JP) .................................. 2019-050735

(51) Int. Cl.
G06F 21/32 (2013.01)
G06F 21/00 (2013.01)
(Continued)

(52) U.S. Cl.
CPC .............. *G06F 21/32* (2013.01); *G06F 21/45* (2013.01); *G06F 21/46* (2013.01); *G06F 21/604* (2013.01);
(Continued)

(58) Field of Classification Search
CPC .......... G06F 21/32; G06F 21/45; G06F 21/46; G06F 21/604; G06F 21/30; G06F 21/31; G06F 21/36
See application file for complete search history.

(56) References Cited

U.S. PATENT DOCUMENTS

2002/0152034 A1  10/2002  Kondo et al.
2012/0281885 A1  11/2012  Syrdal et al.
(Continued)

FOREIGN PATENT DOCUMENTS

JP  2003-30154 A  1/2003
JP  2003-36442 A  2/2003
(Continued)

OTHER PUBLICATIONS

Extended European Search Report issued Sep. 23, 2022, in corresponding European Patent Application No. 20773793.3, 27 pages.
(Continued)

*Primary Examiner* — Edward Zee
(74) *Attorney, Agent, or Firm* — XSENSUS LLP

(57) ABSTRACT

An authentication system includes user information acquisition circuitry configured to acquire user information of a user, the user information including image information of the user or voice information of the user; authentication information extraction circuitry configured to extract, from the user information, authentication information corresponding to a plurality of types of authentication; and authentication circuitry configured to perform an authentication procedure, using the authentication information, to authenticate the user.

19 Claims, 13 Drawing Sheets

(51) Int. Cl.
    *G06F 21/45*     (2013.01)
    *G06F 21/46*     (2013.01)
    *G06F 21/60*     (2013.01)
    *G06V 40/16*     (2022.01)
    *G06V 40/70*     (2022.01)
    *G10L 17/24*     (2013.01)
    *H04L 9/40*     (2022.01)

(52) U.S. Cl.
    CPC ............ *G06V 40/172* (2022.01); *G06V 40/70* (2022.01); *G10L 17/24* (2013.01); *H04L 63/083* (2013.01); *H04L 63/0861* (2013.01)

(56) References Cited

U.S. PATENT DOCUMENTS

| | | | | |
|---|---|---|---|---|
| 2013/0227651 | A1* | 8/2013 | Schultz | G06F 21/32 |
| | | | | 726/4 |
| 2016/0148012 | A1* | 5/2016 | Khitrov | H04L 63/0861 |
| | | | | 726/19 |
| 2016/0308859 | A1 | 10/2016 | Barry et al. | |
| 2016/0350611 | A1 | 12/2016 | Zhang | |
| 2017/0186011 | A1* | 6/2017 | Lieberman | G06Q 20/40145 |
| 2018/0039990 | A1 | 2/2018 | Lindemann | |
| 2021/0335364 | A1 | 10/2021 | Shirai | |
| 2022/0116270 | A1 | 4/2022 | Matsumura | |

FOREIGN PATENT DOCUMENTS

| | | |
|---|---|---|
| JP | 2008-4050 A | 1/2008 |
| JP | 2017-111608 A | 6/2017 |
| JP | 2017-535986 A | 11/2017 |
| WO | 2016/040366 A1 | 3/2016 |

OTHER PUBLICATIONS

International Search Report and Written Opinion mailed on Jun. 2, 2020, received for PCT Application PCT/JP2020/010452, Filed on Mar. 11, 2020, 9 pages including English Translation.

* cited by examiner

AUTHENTICATION SYSTEM AND AUTHENTICATION METHOD

CROSS-REFERENCE TO RELATED APPLICATIONS

The present application is a continuation of, and claims priority to, International application PCT/JP2020/010452, filed Mar. 11, 2020, which claims priority to JP 2019-050735, filed Mar. 19, 2019, and the entire contents of both are incorporated herein by reference.

TECHNICAL FIELD

The present disclosure relates to an authentication system and an authentication method using a plurality of types of authentication.

BACKGROUND

Conventionally, authentication of a user is performed by registering security information such as a password, biometric information, or the like in advance, and then determining whether or not a password or biometric information received from the user matches the registered information.

In order to ensure higher security and authentication accuracy, one-time password authentication using a single-use password, and multi-factor authentication using a plurality of types of authentication has also been adopted. Other systems may use multi-factor authentication using two or more pieces of information among biometric information, possession information, and knowledge information, or multi-factor authentication using a plurality of pieces of biometric information such as a face and a voice.

SUMMARY

In one aspect of the present disclosure, an authentication system comprises user information acquisition circuitry configured to acquire user information of a user, the user information including image information of the user or voice information of the user; authentication information extraction circuitry configured to extract, from the user information, authentication information corresponding to a plurality of types of authentication; and authentication circuitry configured to perform an authentication procedure, using the authentication information, to authenticate the user.

DETAILED DESCRIPTION OF THE DRAWINGS

Conventionally, if multi-factor authentication is used, there is a burden put on the user to perform extra steps and convenience to the user is reduced. For example, when both a password and a face image are used for authentication, the user needs to input the password and take an image of his/her face. An operation by the user is required for each factor to be used for the authentication and therefore, the operation burden on the user increases with an increase in a number of factors for the authentication.

Additionally, authentication data is acquired for each factor to be used for authentication and therefore, the data amount increases with increase in the number of factors for the authentication. The increase in the data amount may cause a serious problem while a terminal device acquires the authentication data and transmits the acquired data to a server device, and the server device performs authentication.

The inventors of the present disclosure have recognized these issues and determined that, in multi-factor authentication using a plurality of types of authentication, it is an important issue to improve efficiency in acquiring and handling the authentication data in order to reduce the burden on the user, and to enhance convenience for the user. The inventors of the present disclosure have developed technology, as will be discussed below, to address these issues.

Hereinafter, exemplary embodiments of an authentication system and an authentication method according to the present invention will be described in detail with reference to the accompanying drawings.

<Authentication System>

Figure 1:
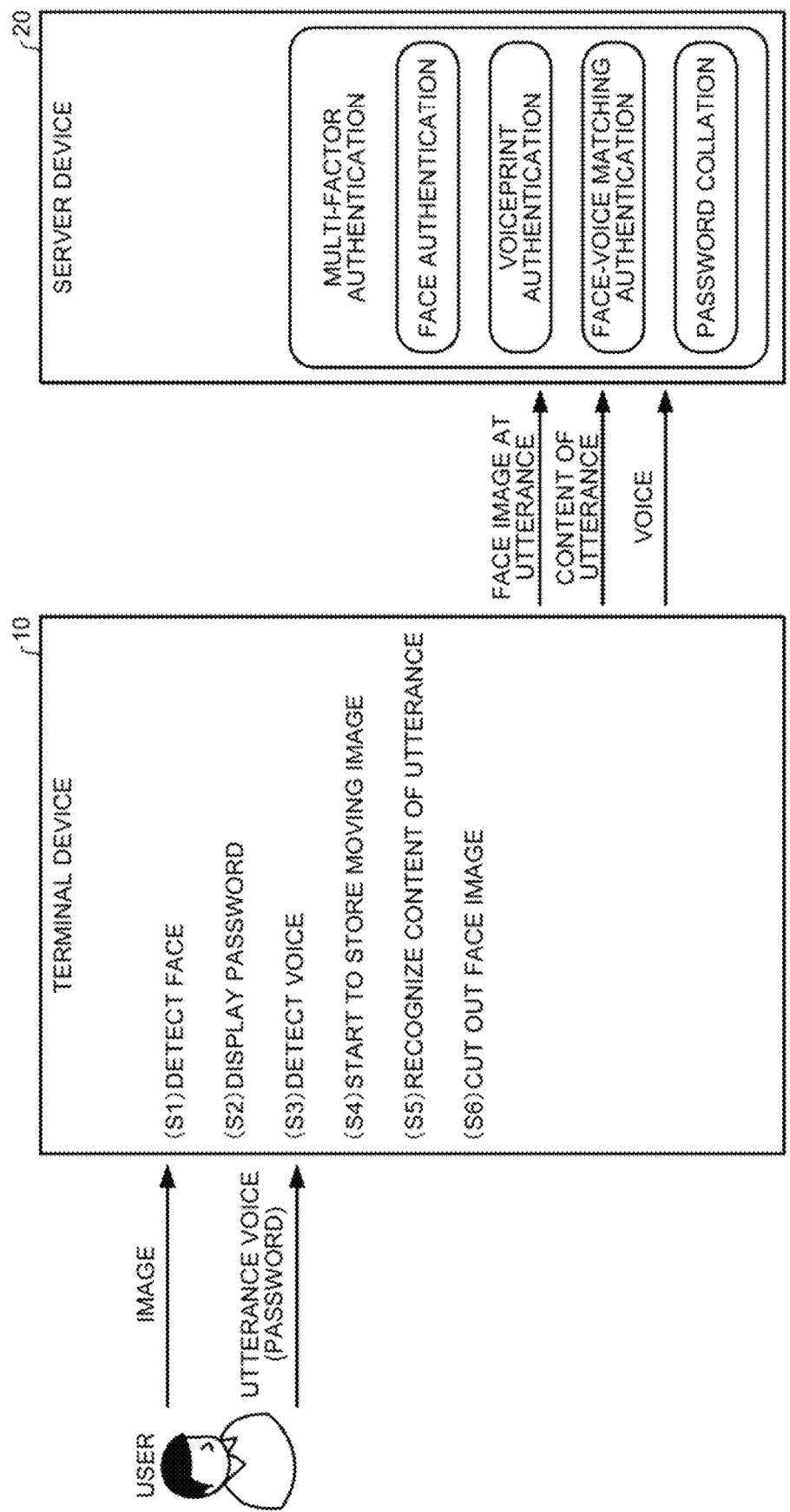
FIG. 1 illustrates an exemplary authentication system according to the present disclosure.

FIG. 1 illustrates an exemplary authentication system according to the present disclosure. A terminal device 10 shown in FIG. 1 acquires an image and a voice of a user as user data, extracts a plurality of types of authentication data from the user data, and transmits the plurality of types of authentication data to a server device 20. The server device 20 performs multi-factor authentication by using the plurality of types of authentication data received from the terminal device 10.

The terminal device 10 uses the user data not only as an extraction source of the authentication data, but also as data for controlling a process for acquiring the authentication data. Moreover, when extracting authentication data from a predetermined type of user data, the terminal device 10 can use another type of user data.

Specifically, the terminal device 10 acquires the image of the user, and detects a face (51). The terminal device 10, having detected the face, displays a password (S2), and urges the user to utter the password. When the user starts to utter the password, the terminal device 10 detects an utterance voice (S3), and starts to store a moving image (S4) of the user.

The terminal device 10 recognizes the content of utterance from the voice (S5). The terminal device 10 cuts out, from data of the moving image, a face image of a timing when the user utters each syllable included in the content of utterance (S6). The face image is cut out at each timing when the user utters each of a plurality of syllables in the content of utterance.

The terminal device 10 transmits authentication data to the server device 20. The authentication data includes the face image at the time of utterance of each syllable, the content of utterance, and the voice. The server device 20 can perform multi-factor authentication including face authentication, voiceprint authentication, face-voice matching authentication, and password collation by using the authentication data received from the terminal device 10.

The face authentication is performed by comparing the face image, at the time of utterance, included in the authentication data with the face image that has been registered in advance for the authentication. The voiceprint authentication is performed by comparing the voice included in the authentication data with the voice that has been registered in advance for the authentication. The face-voice matching authentication is performed by determining whether or not the shape of a mouth in the face image at the time of utterance coincides with a shape of a mouth of the recognized syllable. The password collation is performed by determining whether or not the content of utterance included in the authentication data matches the password that has been displayed on the terminal device 10.

The terminal device 10 uses the face detection for controlling the display of the password. The terminal device 10 uses the voice detection for controlling the storage of moving image. This enables the user to perform input of the face image, input of the voice, and input of the password by only uttering the displayed password while looking at the terminal device 10.

The content of utterance is recognized from the voice, and the face image at the time of utterance is cut out from the moving image data based on the recognized content of the utterance. It makes possible to reduce the data size of the authentication data to be transmitted to the server device 20.

<Configurations of System and Devices>

Figure 2:
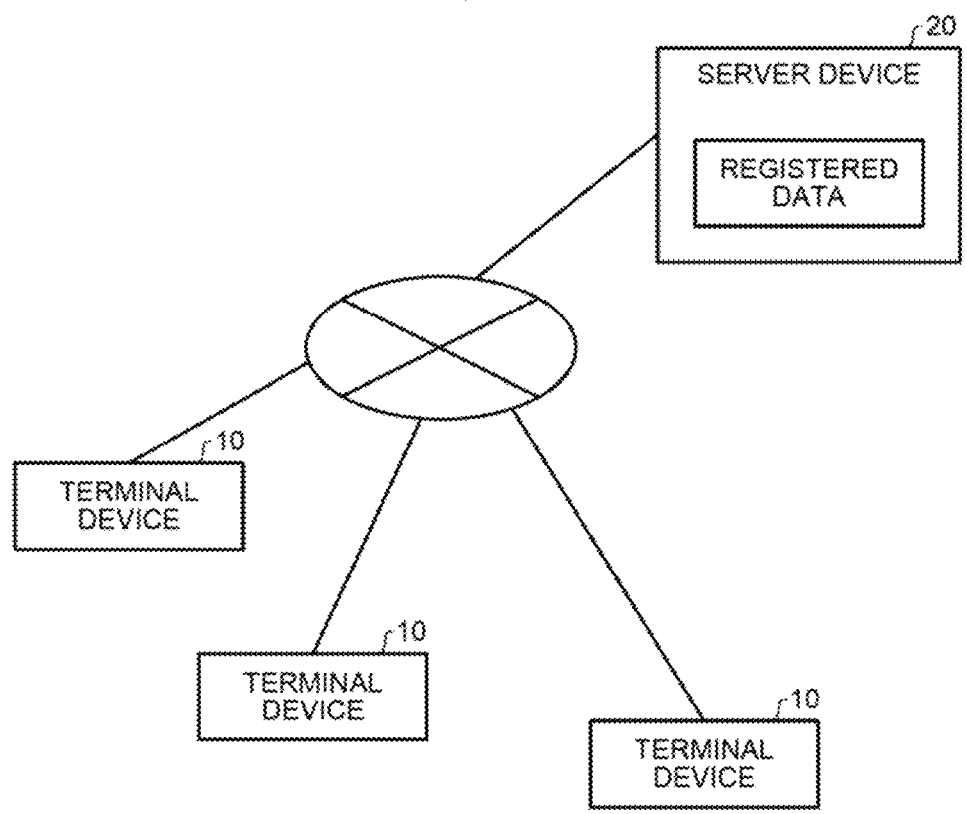
FIG. 2 illustrates a system configuration of the authentication system.

FIG. 2 illustrates a system configuration of the authentication system. As shown in FIG. 2, the server device 20 is connected to a plurality of terminal devices 10 via a predetermined network. The predetermined network may be an open network such as the Internet, or a closed network such as an intra-company network or a financial network.

The server device 20 stores therein face images and voices of users previously prepared as registration data. Upon receiving authentication data from any of the terminal devices 10, the server device 20 performs authentication by comparing the authentication data with the registration data according to need.

Figure 3:
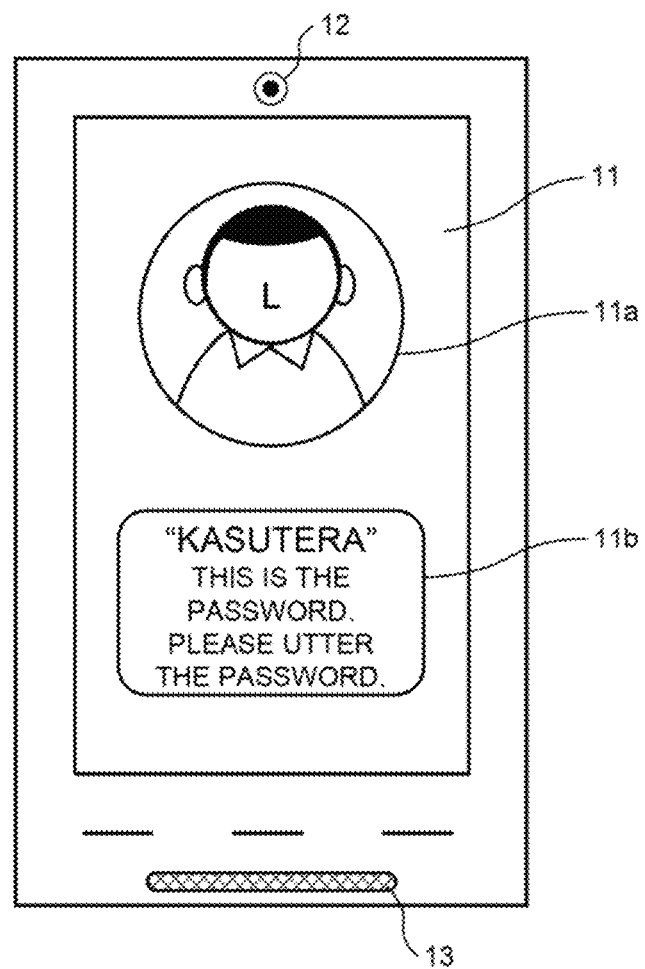
FIG. 3 shows an external configuration of a terminal device.

FIG. 3 shows the external configuration of each terminal device 10. For example, a smartphone is used as the terminal device 10. The terminal device 10 includes a display/operation unit 11, a camera 12, and a microphone 13. The display/operation unit 11 is a touch panel display or the like. The camera 12 is disposed to be able to take an image of a user viewing a screen of the display/operation unit 11. The microphone 13 may be appropriately disposed to be able to acquire the voice of the user.

As shown in FIG. 3, the display/operation unit 11 can display a face image 11a of the user taken by the camera 12, and a message 11b indicating a password to be uttered by the user.

Figure 4:
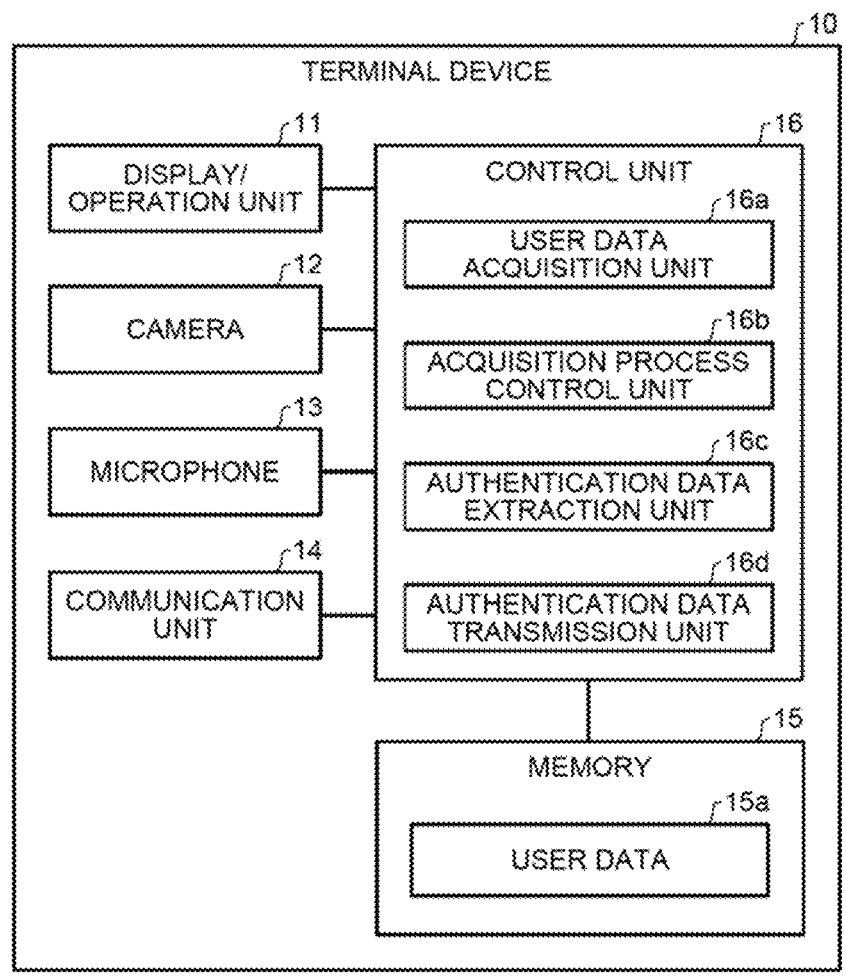
FIG. 4 is a functional block diagram showing a functional configuration of the terminal device.

FIG. 4 is a functional block diagram showing the functional configuration of the terminal device 10. As shown in FIG. 4, the terminal device 10 includes a communication unit 14, a memory 15, and a control unit 16 in addition to the display/operation unit 11, the camera 12, and the microphone 13 already described.

The communication unit 14 is a communication interface to communicate with the server device 20 and the like via the predetermined network. The memory 15 is a memory device such as a non-volatile memory. The memory 15 stores therein various programs, user data 15a, and the like. The user data 15a includes image data and moving image data recorded by using the camera 12, and voice data recorded by using the microphone 13. Moreover, authentication data, and data obtained by processing the user data 15a can also be stored in the memory 15.

The control unit 16 is a CPU (Central Processing Unit) or the like. The control unit 16 reads out a predetermined program from the memory 15 and executes the program to implement functions of a user data acquisition unit 16a, an acquisition process control unit 16b, an authentication data extraction unit 16c, and an authentication data transmission unit 16d. In an exemplary implementation, control unit 16 is encompassed by or may include processing circuitry which will be discussed later with respect to FIG. 13.

The user data acquisition unit 16a acquires the image and the voice of the user as the user data. Specifically, the user data acquisition unit 16a acquires, as the user data 15a, the image taken by the camera 12 and the voice acquired by the microphone 13, and stores the user data 15a in the memory 15. Moreover, the user data acquisition unit 16a can display, in real time, the image taken by the camera 12 on the display/operation unit 11.

The acquisition process control unit 16b controls a process to acquire the authentication data. Specifically, when a face has been detected from the image acquired as the user data, the acquisition process control unit 16b displays a password on the display/operation unit 11. As for the password, it is preferable to generate and use a one-time password that can be used only once.

When a voice has been detected as the user data after displaying the password, the acquisition process control unit 16b starts to store a moving image. The storage of the moving image may be performed such that images successively taken by the camera 12 are stored, in association with each other, as moving image data in the memory 15. Thereafter, upon detecting end of the voice, the acquisition process control unit 16b ends the storage of the moving image.

The authentication data extraction unit 16c extracts, from the user data, a plurality of types of authentication data corresponding to a plurality of types of authentication to be performed. Specifically, the authentication data extraction unit 16c extracts, as the authentication data, a face image, the content of utterance, and a voice of the user. These pieces of authentication data are used for authentications such as face authentication, voiceprint authentication, face-voice matching authentication, and password collation.

When extracting authentication data from a predetermined type of user data, the authentication data extraction unit 16c can use another type of user data. Specifically, the authentication data extraction unit 16c recognizes the content of utterance from the voice acquired as the user data.

Since the content of utterance is the password uttered by the user, the content of utterance is authentication data to be used for password collation.

The authentication data extraction unit 16c uses the content of utterance for cutting-out of a face image. That is, as for each of a plurality of syllables included in the content of utterance, a face image at a timing when the user utters the syllable is cut out from the moving image data.

The authentication data transmission unit 16d transmits the authentication data extracted by the authentication data extraction unit 16c, to the server device 20. When a user, whose data for authentication has been already registered, transmits the authentication data, the authentication data transmission unit 16d transmits the authentication data with an authentication request flag, to the server device 20. When a user, whose data for authentication is to be newly registered, transmits the authentication data, the authentication data transmission unit 16d transmits the authentication data with a registration request flag, to the server device 20.

Figure 5:
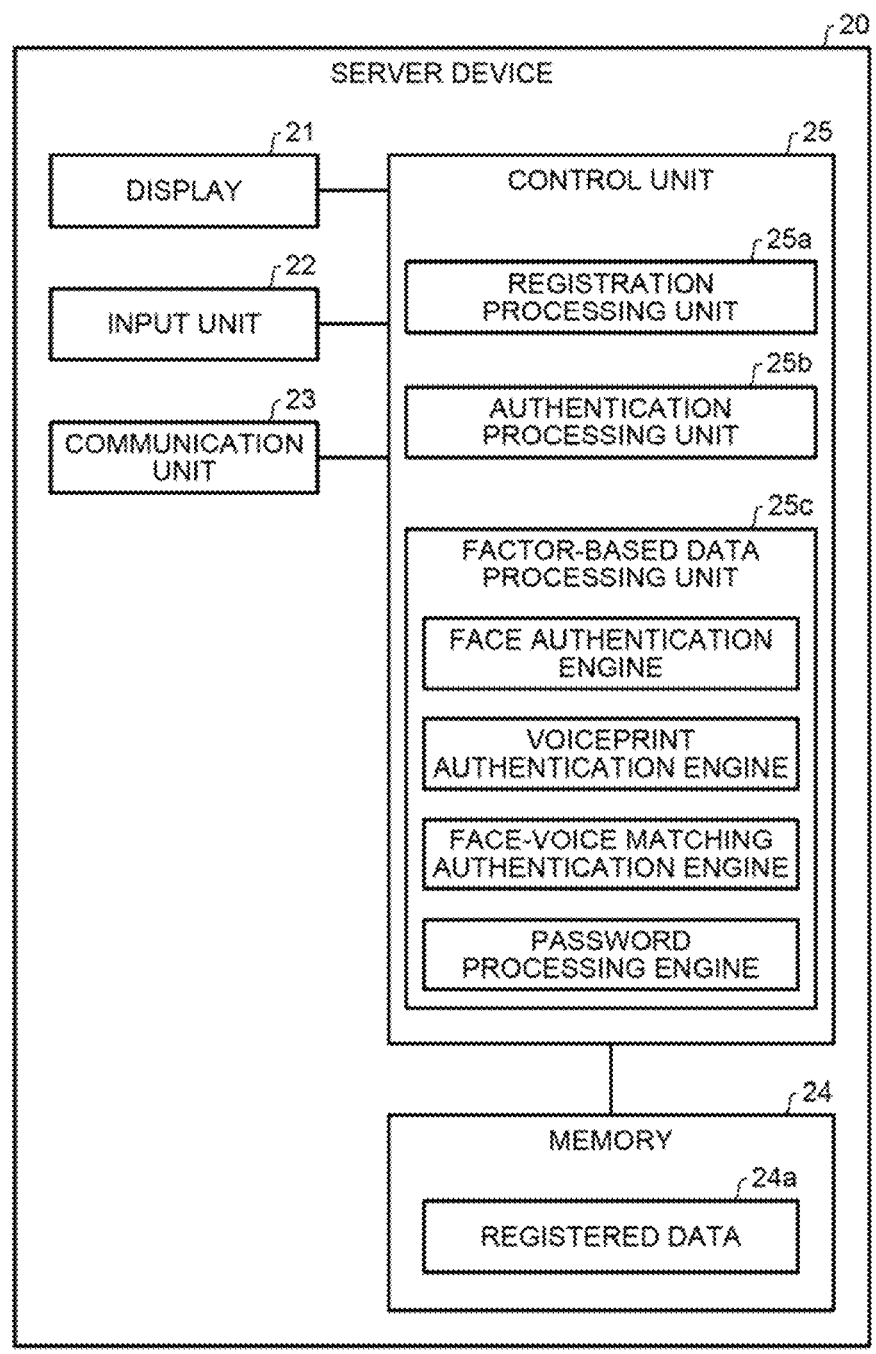
FIG. 5 is a functional block diagram showing a functional configuration of a server device.

FIG. 5 is a functional block diagram showing the functional configuration of the server device 20. As shown in FIG. 5, the server device 20 includes a display 21, an input unit 22, a communication unit 23, a memory 24, and a control unit 25.

The display 21 is a display device such as a liquid crystal display. The input unit 22 is an input device such as a keyboard and a mouse. The communication unit 23 is a communication interface to communicate with the terminal devices 10. The memory 24 is a memory device such as a hard disk drive. The memory 24 stores therein face images and voices of users as registration data 24a.

The control unit 25 controls the entirety of the server device 20. The control unit 25 includes a registration processing unit 25a, an authentication processing unit 25b, and a factor-based data processing unit 25c. In actuality, programs corresponding to these functional units are stored in a ROM or a non-volatile memory, and the programs are loaded to a CPU and executed, thereby causing the CPU to perform the processes corresponding to the registration processing unit 25a, the authentication processing unit 25b, and the factor-based data processing unit 25c. In an exemplary implementation, control unit 25 is encompassed by or may include processing circuitry which will be discussed later with respect to FIG. 13.

The registration processing unit 25a stores, in the memory 24, a face image and a voice of a user as registration data 24a. Specifically, upon receiving authentication data to which a registration request flag is attached, the registration processing unit 25a causes the factor-based data processing unit 25c to process the authentication data, and performs registration on the condition that validity of the authentication data is confirmed. The validity of the authentication data can be confirmed through password collation or face-voice matching authentication performed by the factor-based data processing unit 25c. The face image and the voice included in the authentication data are objects to be registered in the registration data 24a. The face image and the voice may be registered as they are, or data indicating the feature of the face and data indicating the feature of the voiceprint may be registered in the registration data 24a.

The authentication processing unit 25b performs authentication of the user, based on a request from the terminal device 10. Specifically, upon receiving authentication data to which an authentication request flag is attached, the authentication processing unit 25b causes the factor-based data processing unit 25c to process the authentication data. The authentication processing unit 25b performs multi-factor authentication of the user based on the processing results of the respective factors.

The factor-based data processing unit 25c performs data processing individually for each of the factors included in the authentication data. The factor-based data processing unit 25c includes a face authentication engine, a voiceprint authentication engine, a face-voice matching authentication engine, and a password processing engine.

The face authentication engine performs a process of comparing the face image included in the authentication data with the face image in the registration data 24a to determine the degree of matching. The voiceprint authentication engine performs a process of comparing the voice included in the authentication data with the voice in the registration data 24a to determine the degree of matching. The face-voice matching authentication engine performs a process of determining the degree of matching between the shape of a mouth in the face image at the time of utterance and the recognized syllable in the utterance. The password processing engine performs a process of determining whether or not the content of utterance included in the authentication data matches the password displayed on the terminal device 10. The password displayed on the terminal device 10 may be a password registered in advance, or a one-time password that is generated and can be used only once. The password registered in advance can be stored in the registration data 24a. The single-use one-time password may be, for example, generated by the password processing engine and transmitted to the terminal device 10.

<Description of Processing>

Figure 6:
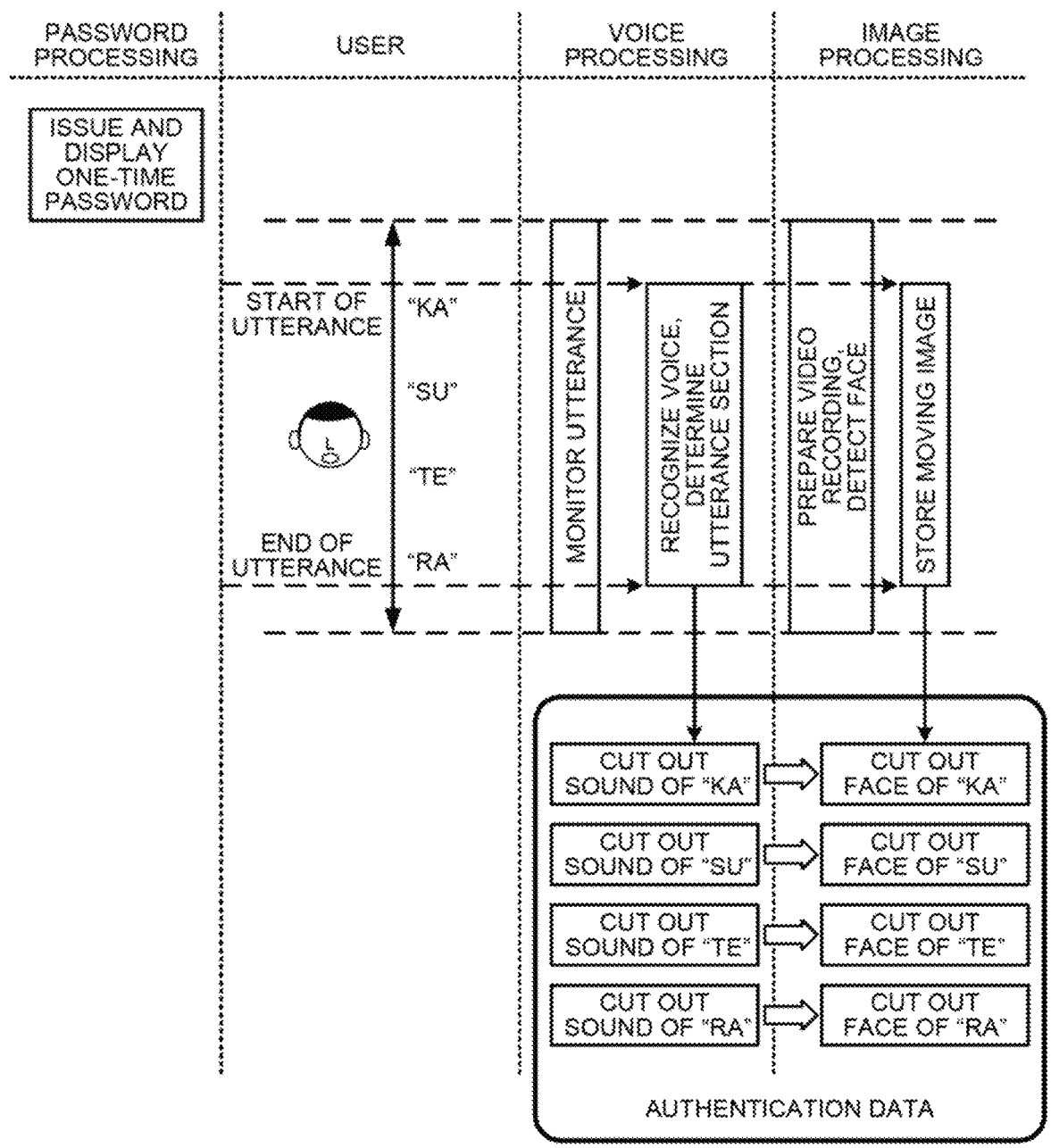
FIG. 6 illustrates exemplary processing of the terminal device.

FIG. 6 illustrates an exemplary processing of the terminal device 10. FIG. 6 illustrates the processing after a one-time password is issued and displayed. The issuance and the display of the password is performed when a face is detected as a trigger. In the example shown in FIG. 6, the password is "kasutera".

The terminal device 10 performs, simultaneously with display of the one-time password, monitoring of utterance, preparation for video recording, and detection of faces. Upon detecting start of utterance, the terminal device 10 starts to store a moving image with this start being a start edge of an utterance section, and starts to recognize the content of utterance through voice recognition. Thereafter, upon detecting end of utterance, the terminal device 10 ends the storage of the moving image with this end being an end edge of the utterance section, and ends the recognition of the content of utterance through voice recognition.

In FIG. 6, as the result of the voice recognition, four syllables, "ka", "su", "te", and "ra", are recognized. The terminal device 10, for each of the four syllables, extracts a voice and a face image at a timing when the user utters the syllable, and the terminal device 10 associates the voice with the face image, thereby providing authentication data.

Figure 7:
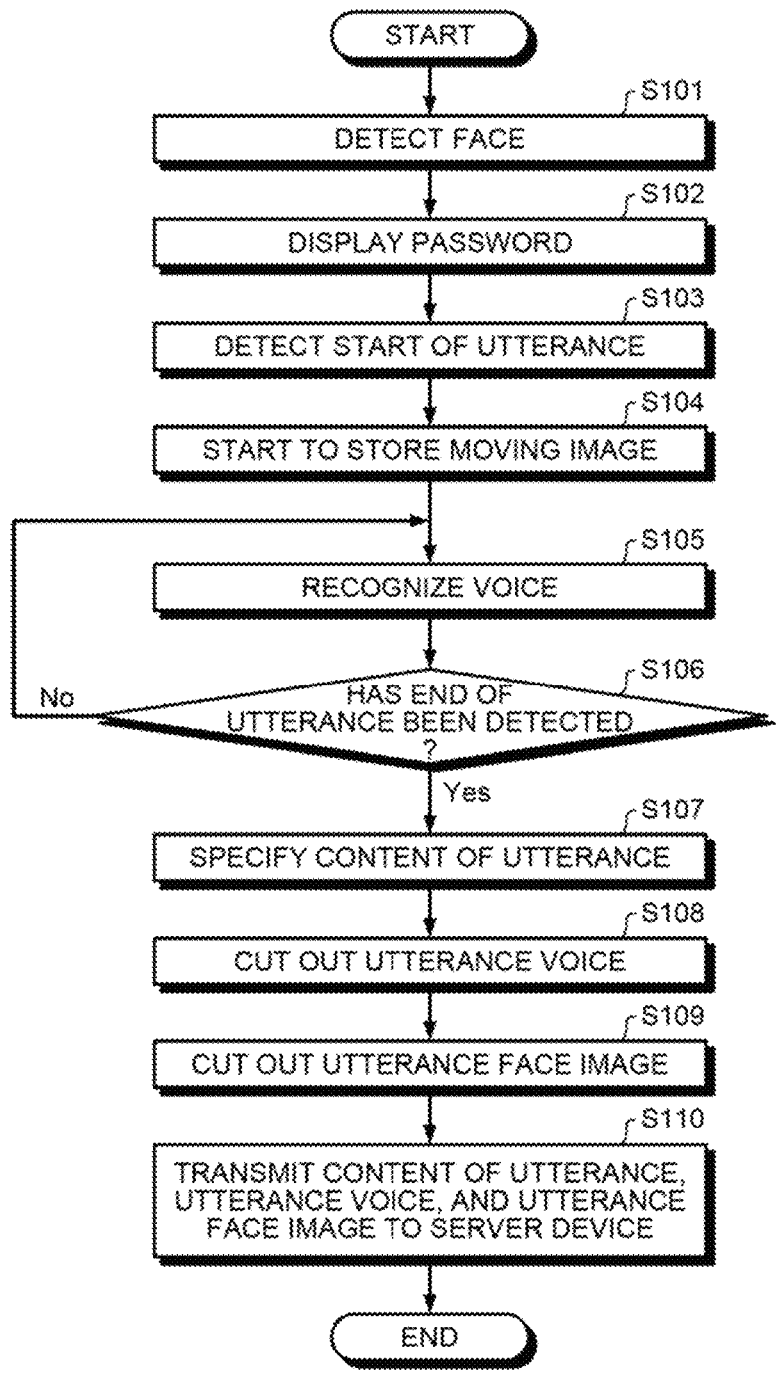
FIG. 7 is a flowchart showing a processing procedure of the terminal device.

FIG. 7 is a flowchart showing a processing procedure performed by the terminal device 10. Firstly, the acquisition process control unit 16b of the terminal device 10 detects a face from an image acquired as user data (step S101), and displays a password on the display/operation unit 11 (step S102).

Thereafter, the acquisition process control unit 16b detects start of utterance from a voice acquired as user data (step S103), and starts to store a moving image (step S104). The authentication data extraction unit 16c recognizes the voice (step S105).

If the acquisition process control unit 16b does not detect end of the utterance from the voice acquired as the user data (step S106; No), the acquisition process control unit 16b goes to step S105. Meanwhile, upon detecting end of the utterance (step S106; Yes), the authentication data extraction unit 16c specifies the content of utterance, based on the result of the voice recognition (step S107). The authentication data extraction unit 16c cuts out an utterance voice for each syllable (step S108), and cuts out an utterance face image for each syllable (step S109) based on the voice recognition result. Then, the authentication data transmission unit 16d transmits the content of utterance, the utterance voices, and the utterance face images, as authentication data, to the server device 20 (step S110), and ends the processing.

Figure 8:
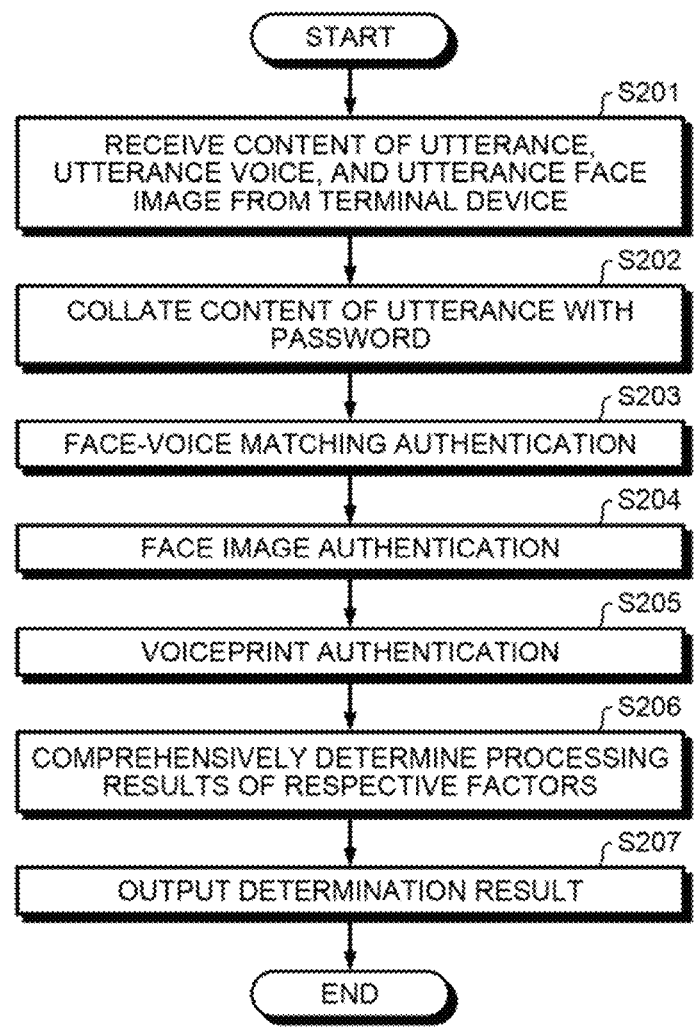
FIG. 8 is a flowchart showing a processing procedure of the server device at the time of authentication.

FIG. 8 is a flowchart showing a processing procedure performed by the server device 20 at the time of authentication. Firstly, the authentication processing unit 25b of the server device 20 receives the content of utterance, the utterance voices, and the utterance face images as the authentication data from the terminal device 10 (step S201).

The factor-based data processing unit 25c collates the content of utterance with the password by using the password processing engine (step S202). Moreover, the factor-based data processing unit 25c performs face-voice matching authentication by using the face-voice matching authentication engine (step S203), performs face image authentication by using the face authentication engine (step S204), and performs voiceprint authentication by using the voiceprint authentication engine (step S205).

The authentication processing unit 25b comprehensively determines the processing results of the respective factors (step S206), and outputs the determination result (step S207) to end the processing.

Figure 9:
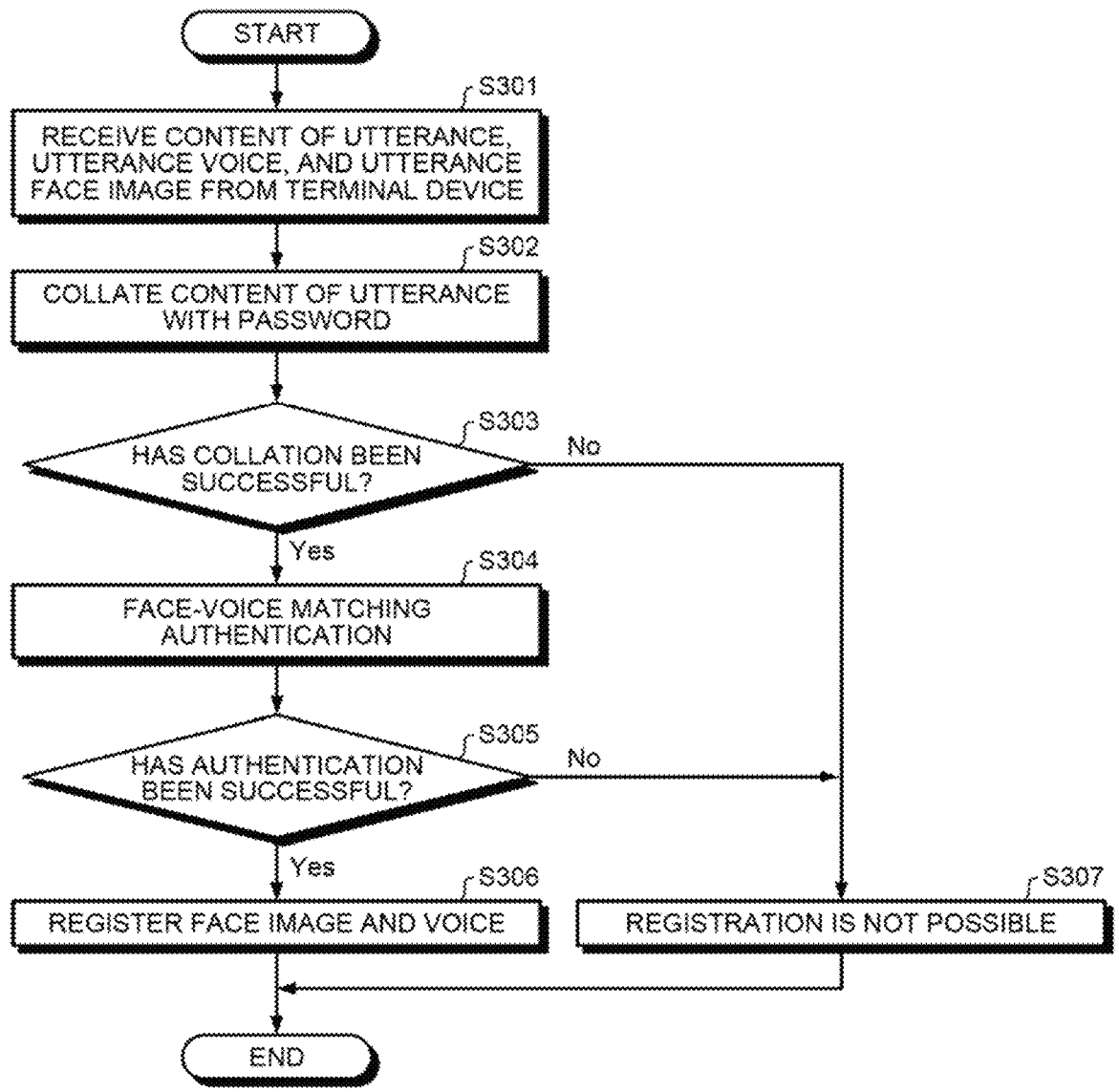
FIG. 9 is a flowchart showing a processing procedure of the server device at the time of registration.

FIG. 9 is a flowchart showing a processing procedure performed by the server device 20 at the time of registration. Firstly, the registration processing unit 25a of the server device 20 receives the content of utterance, the utterance voice, and the utterance face image as the authentication data from the terminal device 10 (step S301).

The factor-based data processing unit 25c collates the content of utterance with the password by using the password processing engine (step S302). When the collation has been successful with the content of utterance matching the password (step S303; Yes), the factor-based data processing unit 25c performs face-voice matching authentication by using the face-voice matching authentication engine (step S304).

When the face-voice matching authentication has been successful (step S305; Yes), the registration processing unit 25a registers the face image and the voice included in the authentication data (step S306), and ends the processing. When the collation has failed (step S303; No) or when the authentication has failed (step S305; No), the registration processing unit 25a determines that registration is not possible (step S307), and ends the processing after notifying this situation according to need.

<Modifications>

In the above description, the terminal device 10 extracts the content of utterance, a face image, and a voice from moving image data, and transmits them as authentication data to the server device 20. However, the terminal device 10 may transmit the moving image data to the server device 20, and the server device may extract the content of utterance, a face image, and a voice from the moving image data.

Figure 10:
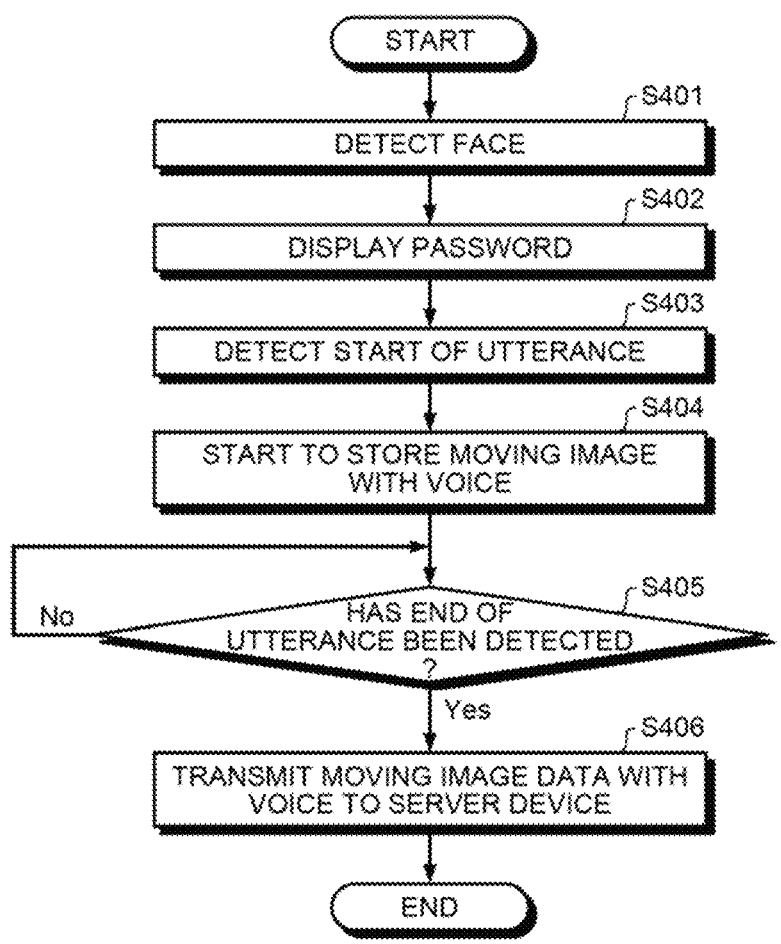
FIG. 10 is a flowchart showing a processing procedure of the terminal device configured to transmit/receive moving image data.

FIG. 10 is a flowchart showing a processing procedure performed by the terminal device 10 configured to transmit/receive the moving image data. The acquisition process control unit 16b of the terminal device 10 detects a face from an image acquired as user data (step S401), and displays a password on the display/operation unit 11 (step S402).

Thereafter, the acquisition process control unit 16b detects start of utterance from a voice acquired as user data (step S403), and starts to store a moving image and a voice associated with the moving image (moving image with voice) (step S404). If the acquisition process control unit 16b does not detect end of the utterance from the voice acquired as the user data (step S405; No), the acquisition process control unit 16b goes to step S405 and continues storing the moving image with voice. Meanwhile, upon detecting end of the utterance (step S405; Yes), the authentication data transmission unit 16d transmits data of the moving image with voice, as authentication data, to the server device 20 (step S406), and ends the processing.

Figure 11:
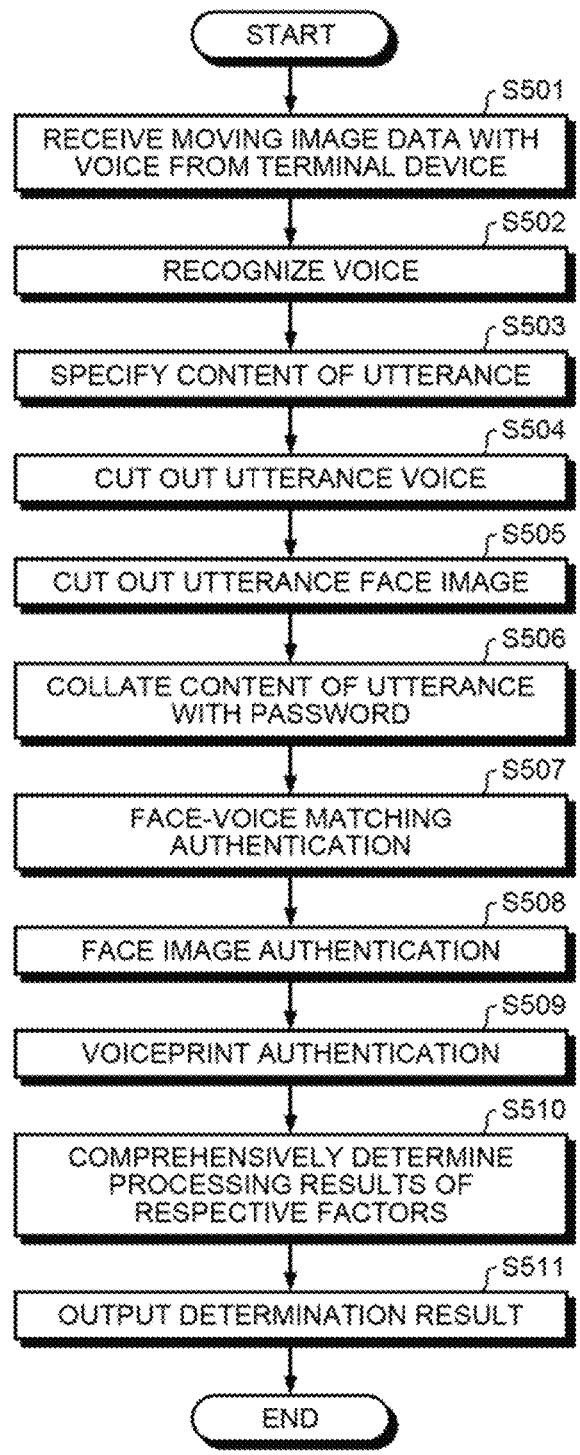
FIG. 11 is a flowchart showing a processing procedure of the server device configured to transmit/receive moving image data, at the time of authentication.

FIG. 11 is a flowchart showing a processing procedure performed by the server device 20, which is configured to transmit/receive the moving image data, at the time of authentication. Firstly, the authentication processing unit 25b of the server device 20 receives the data of the moving image with voice, as the authentication data, from the terminal device 10 (step S501).

The authentication processing unit 25b recognizes the voice in the data of the moving image with voice (step S502), and specifies the content of utterance (step S503). Then, the authentication processing unit 25b cuts out an utterance voice for each syllable (step S504), and cuts out an utterance face image for each syllable (step S505).

The factor-based data processing unit 25c collates the content of utterance with the password by using the password processing engine (step S506). Moreover, the factor-based data processing unit 25c performs face-voice matching authentication by using the face-voice matching authentication engine (step S507), performs face image authentication by using the face authentication engine (step S508), and performs voiceprint authentication by using the voiceprint authentication engine (step S509).

The authentication processing unit 25b comprehensively determines the processing results of the respective factors (step S510), and outputs the determination result (step S511) to end the processing.

Figure 12:
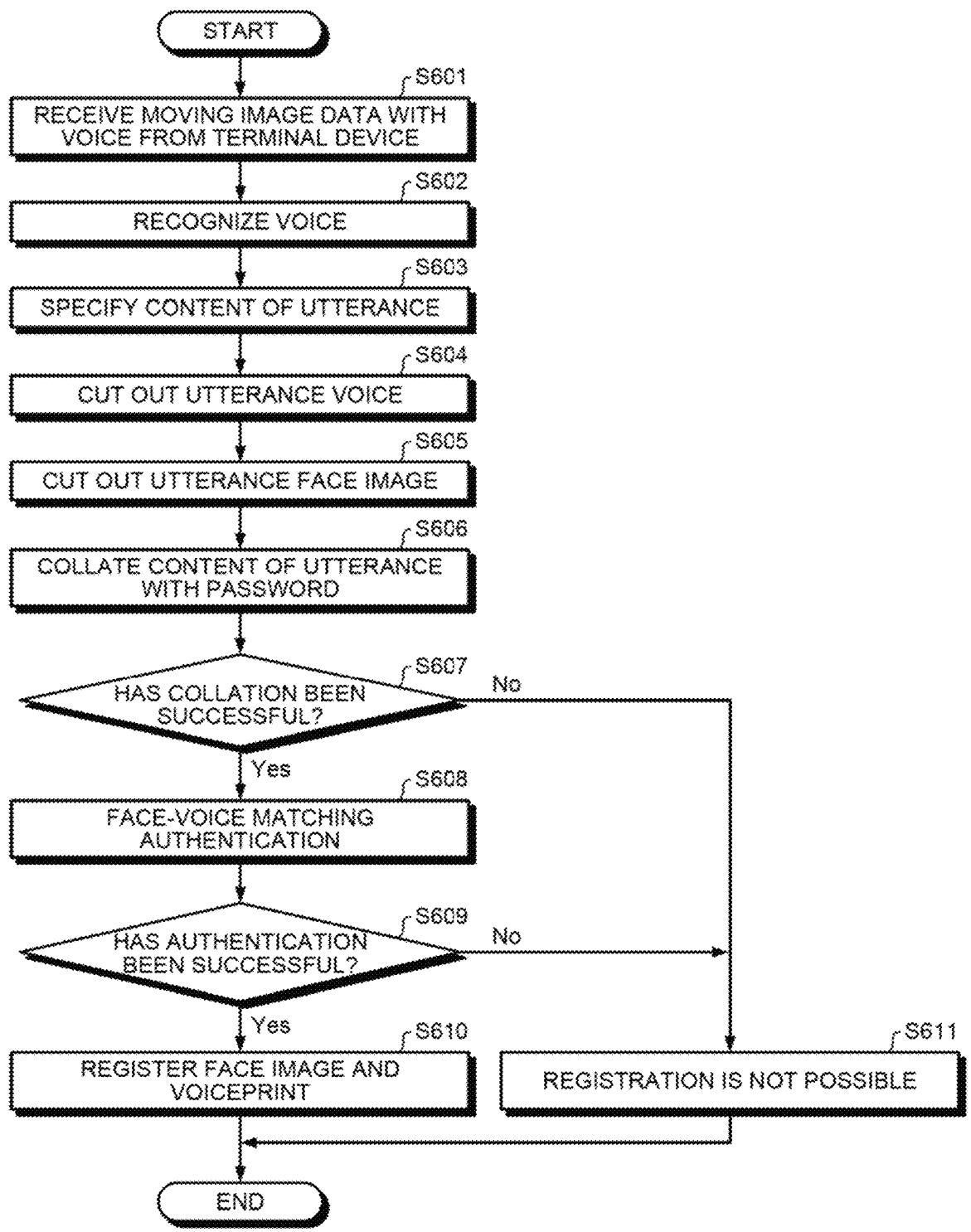
FIG. 12 is a flowchart showing a processing procedure of the server device configured to transmit/receive moving image data, at the time of authentication.

FIG. 12 is a flowchart showing a processing procedure performed by the server device 20, which is configured to transmit/receive the moving image data, at the time of registration. Firstly, the registration processing unit 25a of the server device 20 receives the data of the moving image with voice, as the authentication data, from the terminal device 10 (step S601).

The authentication processing unit 25b recognizes the voice in the data of the moving image with voice (step S602), and specifies the content of utterance (step S603). Then, the authentication processing unit 25b cuts out an utterance voice for each syllable (step S604), and cuts out an utterance face image for each syllable (step S605).

The factor-based data processing unit 25c collates the content of utterance with the password by using the password processing engine (step S606). When the collation has been successful with the content of utterance matching the password (step S607; Yes), the factor-based data processing unit 25c performs face-voice matching authentication by using the face-voice matching authentication engine (step S608).

When the face-voice matching authentication has been successful (step S609; Yes), the registration processing unit 25a registers the face image and the voice included in the authentication data (step S610), and ends the processing. When the collation has failed (step S607; No) or when the authentication has failed (step S609; No), the registration processing unit 25a determines that registration is not possible (step S611), and ends the processing after notifying this situation according to need. As described above, in an exemplary embodiment, an authentication system acquires user data including an image and a voice of a user, extracts, from the user data, authentication data corresponding to a plurality of types of authentication, and performs authentication of the user by using the authentication data. In multi-factor authentication using a plurality of types of authentication, the above-described configuration and operation improve efficiency in acquiring and handling the authentication data, reduce the burden on the user, and enhance convenience for the user.

As for the authentication data, information including factors such as a face image of the user, a voice of the user, a password that the user has uttered, and a degree of matching between the face and the voice of the user, can be used.

According to the exemplary embodiment, a process related to acquisition of the authentication data can be controlled based on the user data. Specifically, the password can be displayed when a face image has been acquired as the user data, and acquisition of a moving image of the user can be started when a voice has been acquired as the user data after displaying the password.

According to the exemplary embodiment, when authentication data is extracted from a predetermined type of user data, another type of user data can be used. Specifically, the content of utterance can be recognized from the voice acquired as the user data, and the face image can be extracted from the image acquired as the user data, based on the content and timing of utterance.

According to the exemplary embodiment, the terminal device can acquire user data, and the server device communicable with the terminal device can perform authentication.

The constituent elements described in the above embodiments are conceptually functional constituent elements, and thus may not be necessarily configured as physical constituent elements illustrated in the drawings. That is, distributed or integrated forms of each device are not limited to the forms illustrated in the drawings, and all or some of the forms may be distributed or integrated functionally or physically in any unit depending on various loads, use statuses, or the like.

For example, password collation and face-voice matching authentication may be performed by the terminal device 10, and authentication data may be transmitted to the server device 20 on the condition that the password collation and the face-voice matching authentication have been successful. In this case, the data used for the password collation and the face-voice matching authentication may not necessarily be transmitted to the server device 20.

In an exemplary embodiment, although the factor-based data processing unit including the face authentication engine, the voiceprint authentication engine, and the like is disposed inside the server device 20, the factor-based data processing unit may be disposed outside the server device 20. For example, the control unit 25 of the server device 20 may be communicably connected to an additional server so as to transmit/receive authentication information and authentication results to/from the additional server via an API (Application Programming Interface). Such an additional server may be provided for each authentication, or may be configured to perform some of a plurality of types of authentication. That is, it is possible to perform face authentication inside the server device 20 while password collation is performed in another server, for example.

In the exemplary embodiment, for the sake of simplicity, the server device 20 is provided with the memory 24 as a physical memory device. However, the memory 24 may be a virtual memory device constructed in a cloud environment. Likewise, the various functions of the server device 20 can also be virtually constructed.

The user data and the authentication data described in the above exemplary are merely examples, and any data can be appropriately used. For example, the terminal device 10 may recognize whether the user wears a mask or whether the user has hoarse voice from a cold, and notifies the server device 20 of this, and then the server device 20 may perform authentication while considering presence/absence of a mask or the hoarse voice.

Figure 13:
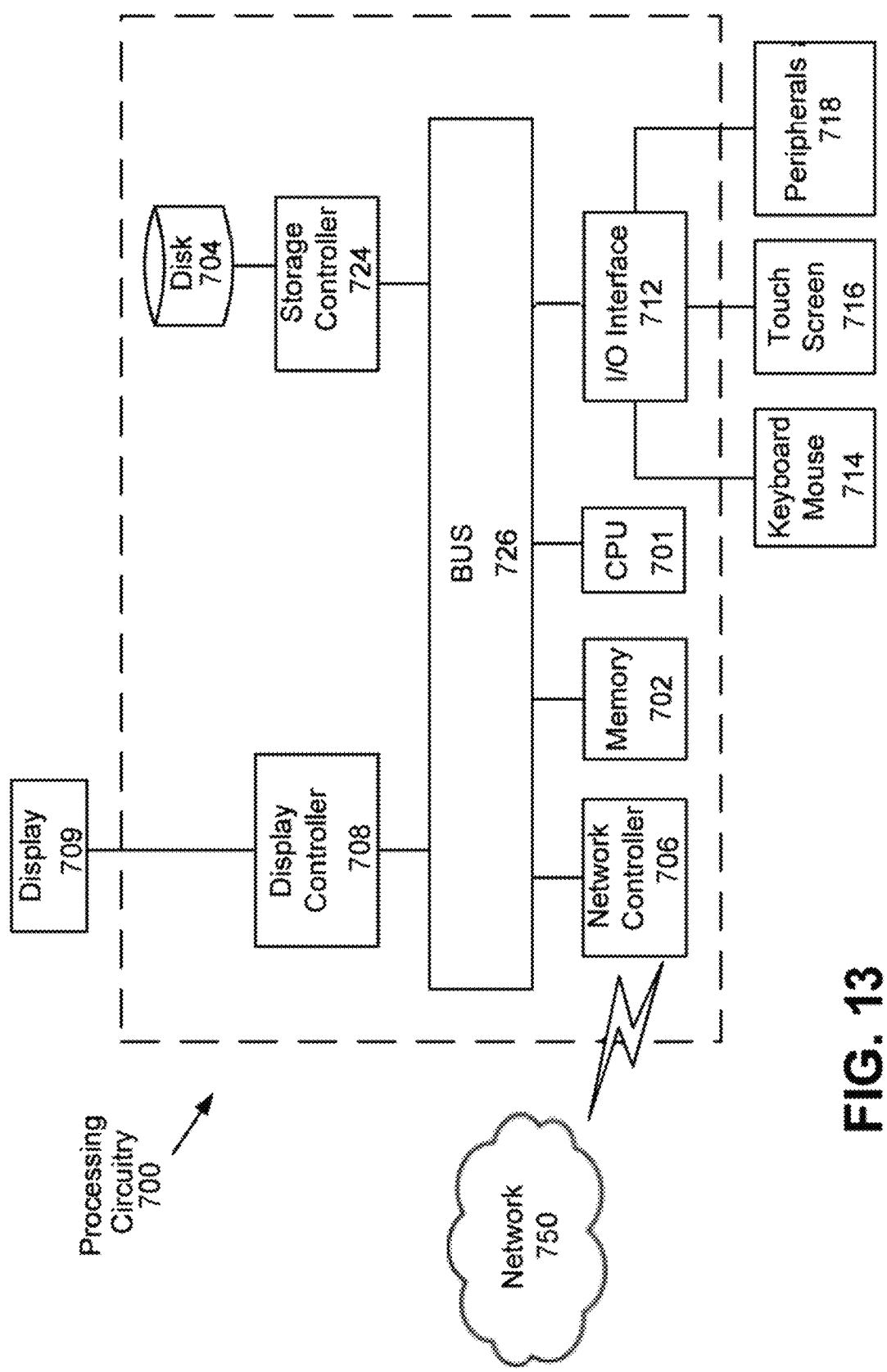
FIG. 13 is a block diagram of processing circuitry that performs computer-based operations in accordance with the present disclosure.

FIG. 13 is a block diagram of processing circuitry that performs computer-based operations in accordance with the present disclosure. FIG. 13 illustrates processing circuitry 700 is included in or encompasses control unit 16, which is a component of terminal device 10. Additionally, processing circuitry 700 which is included in or encompasses control unit 25, which is a component of server device 20.

Processing circuitry 700 is used to control any computer-based and cloud-based control processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The functionality of the elements disclosed herein may be implemented using circuitry or processing circuitry which may include general purpose processors, special purpose processors, integrated circuits, ASICs ("Application Specific Integrated Circuits"), conventional circuitry and/or combinations thereof which are configured or programmed to perform the disclosed functionality. Processors are processing circuitry or circuitry as they include transistors and other circuitry therein. The processor may be a programmed processor which executes a program stored in a memory. In the disclosure, the processing circuitry, units, or means are hardware that carry out or are programmed to perform the recited functionality. The hardware may be any hardware disclosed herein or otherwise known which is programmed or configured to carry out the recited functionality.

In FIG. 13, the processing circuitry 700 includes a CPU 701 which performs one or more of the control processes discussed in this disclosure. The process data and instructions may be stored in memory 702. These processes and instructions may also be stored on a storage medium disk 704 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other non-transitory computer readable medium of an information processing device with which the processing circuitry 700 communicates, such as a server or computer. The processes may also be stored in network based storage, cloud-based storage or other mobile accessible storage and executable by processing circuitry 700.

Further, the claimed advancements may be provided as a utility application, background daemon, or component of an operating system, or combination thereof, executing in conjunction with CPU 701 and an operating system such as Microsoft Windows, UNIX, Solaris, LINUX, Apple MAC-OS, Apple iOS and other systems known to those skilled in the art.

The hardware elements in order to achieve the processing circuitry 700 may be realized by various circuitry elements. Further, each of the functions of the above described embodiments may be implemented by circuitry, which includes one or more processing circuits. A processing circuit includes a particularly programmed processor, for example, processor (CPU) 701, as shown in FIG. 13. A processing circuit also includes devices such as an application specific integrated circuit (ASIC) and conventional circuit components arranged to perform the recited functions.

In FIG. 13, the processing circuitry 700 may be a computer or a particular, special-purpose machine. Processing circuitry 700 is programmed to execute processing to control terminal device 10/server device 20.

Alternatively, or additionally, the CPU 701 may be implemented on an FPGA, ASIC, PLD or using discrete logic circuits, as one of ordinary skill in the art would recognize. Further, CPU 701 may be implemented as multiple processors cooperatively working in parallel to perform the instructions of the inventive processes described above.

The processing circuitry 700 in FIG. 13 also includes a network controller 706, such as an Ethernet PRO network interface card, for interfacing with network 750. As can be appreciated, the network 750 can be a public network, such as the Internet, or a private network such as a local area network (LAN) or wide area network (WAN), or any combination thereof and can also include Public Switched Telephone Network (PSTN) or Integrated Services Digital Network (ISDN) sub-networks. The network 750 can also be wired, such as an Ethernet network, universal serial bus (USB) cable, or can be wireless such as a cellular network including EDGE, 3G and 4G wireless cellular systems. The wireless network can also be Wi-Fi, wireless LAN, Bluetooth, or any other wireless form of communication that is known. Additionally, network controller 706 may be compliant with other direct communication standards, such as Bluetooth, a near field communication (NFC), infrared ray or other.

The processing circuitry 700 further includes a display controller 708, such as a graphics card or graphics adaptor for interfacing with display 709, such as a monitor. An I/O interface 712 interfaces with a keyboard and/or mouse 714 as well as a touch screen panel 716 on or separate from display 709. I/O interface 712 also connects to a variety of peripherals 718.

The storage controller 724 connects the storage medium disk 704 with communication bus 726, which may be an ISA, EISA, VESA, PCI, or similar, for interconnecting all of the components of the processing circuitry 700. A description of the general features and functionality of the display 709, keyboard and/or mouse 714, as well as the display controller 708, storage controller 724, network controller 706, and I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

In one aspect of the present disclosure, an authentication system using a plurality of types of authentication includes: a user information acquisition unit configured to acquire image information and/or sound information as user information; an authentication information extraction unit configured to extract, from the user information, authentication information corresponding to the plurality of types of authentication; and an authentication unit configured to perform authentication of a user by using the authentication information.

In the above configuration, the authentication information extraction unit extracts, as the authentication information, information including at least one of factors that are a face image of the user, a voice of the user, a password that the user has uttered, and a degree of matching between the face and the voice of the user.

In the above configuration, the authentication system further includes a process control unit configured to control a process related to acquisition of the authentication information, based on the user information.

In the above configuration, when a face image has been acquired as the user information, the process control unit displays a password.

In the above configuration, when a voice has been acquired as the user information after displaying the password, the process control unit starts to acquire a moving image of the user.

In the above configuration, when extracting authentication information from a predetermined type of user information, the authentication information extraction unit uses another type of user information.

In the above configuration, the authentication information extraction unit recognizes a content of utterance from a voice acquired as the user information, and extracts a face image from an image acquired as the user information, based on the content and timing of utterance.

In the above configuration, the user information acquisition unit is included in a terminal device, and the authentication unit is included in a server device capable of communicating with the terminal device.

In one aspect of the present disclosure, an authentication method using a plurality of types of authentication includes: acquiring an image and/or a voice of a user as user information; extracting, from the user information, authentication information corresponding to the plurality of types of authentication; and performing authentication of a user by using the authentication information.

According to the present disclosure, it is possible to enhance convenience in an authentication system using a plurality of types of authentication.

The invention claimed is:

1. An authentication system, comprising:
a display to display a one-time use password;
user information acquisition circuitry configured to acquire user information of a user, wherein:
the user information includes image information of the user and voice information of the user,
the voice information of the user includes sound data split into a plurality of sub-parts, the sound data of a voice of the user uttering the one-time use password, and
the image information includes a plurality of images of a face of the user, each image being captured at a time corresponding to each sub-part of the plurality of sub-parts of the sound data;
authentication information extraction circuitry configured to;
recognize a content of the sound data, and
extract, from the user information and based on the content and a timing of the plurality of sub-parts of the sound data, a face image of the user from the image information; and
authentication circuitry configured to perform an authentication procedure to authenticate the user based on face authentication of the face image of the user, voiceprint authentication of the voice of the user and collation of the one-time use password uttered by the voice of the user.

2. The authentication system according to claim 1, wherein the authentication information extraction circuitry extracts, as authentication information, a degree of matching between the face and the voice of the user.

3. The authentication system according to claim 1, further comprising processing circuitry is configured to control the display to display the one-time use password in a case that a face image is acquired as the user information.

4. The authentication system according to claim 3, wherein the processing circuitry is further configured to start acquiring a moving image of the user, including the plurality of images, in a case that a voice is acquired as the user information after the display of the one-time use password.

5. The authentication system according to claim 1, wherein
the user information acquisition circuitry is included in a terminal device, and
the authentication circuitry is included in a server device configured to communicate with the terminal device.

6. The authentication system according to claim 1, wherein after recognizing the content of the sound data, the authentication information extraction circuitry extracts the face image from the plurality of images of the face of the user.

7. The authentication system according to claim 6, wherein the authentication information extraction circuitry extracts a different face image captured at a timing of each sub-part of the plurality of sub-parts of the sound data.

8. The authentication system according to claim 7, wherein authentication circuitry performs the authentication procedure to authenticate the user based on face authentication of one or more face images of the user.

9. An authentication method, comprising:
displaying a one-time use password;
acquiring user information of a user, wherein:
the user information includes image information of the user and voice information of the user,
the voice information of the user includes sound data split into a plurality of sub-parts, the sound data of a voice of the user uttering the one-time use password, and
the image information includes a plurality of images of a face of the user, each image being captured at a time corresponding to each sub-part of the plurality of sub-parts of the sound data;
recognizing a content of the sound data;
extracting, by processing circuitry from the user information and based on the content and a timing of the plurality of sub-parts of the sound data, a face image of the user from the image information; and
performing an authentication procedure to authenticate the user based on face authentication of the face image of the user, voiceprint authentication of the voice of the user and collation of the one-time use password uttered by the voice of the user.

10. The authentication method according to claim 9, further comprising extracting, as authentication information, a degree of matching between the face and the voice of the user.

11. The authentication method according to claim 10, further comprising controlling a process related to acquisition of the authentication information, based on the user information.

12. The authentication method according to claim 11, further comprising controlling a display to display the one-time use password in a case that a face image is acquired as the user information.

13. The authentication method according to claim 12, further comprising starting to acquire a moving image of the user, including the plurality of images, in a case that a voice is acquired as the user information after the display of the one-time use password.

14. A terminal device, comprising:
processing circuitry configured to:
control a display to display a one-time use password;
acquire user information of a user, wherein:
the user information includes image information of the user and voice information of the user
the voice information of the user includes sound data split into a plurality of sub-parts, the sound data of a voice of the user uttering the one-time use password, and
the image information includes a plurality of images of a face of the user, each image being captured at a time corresponding to each sub-part of the plurality of sub-parts of the sound data;
recognize a content of the sound data:
extract, from the user information as authentication information, information including a face image of the user, a voice of the user, a password that the user has uttered, and/or a degree of matching between the face and the voice of the user; and
transmit the authentication information to an authentication server for an authentication procedure which uses the authentication information to authenticate the face of the user, the voice of the user and collation of the one-time use password, wherein
the processing circuitry extracts the face image of the user based on the content and a timing of the plurality of sub-parts of the sound data.

15. The terminal device according to claim 14, further comprising:
a display, wherein
the processing circuitry is further configured to control the display to display the one- time use password in a case that the face image is acquired as the user information.

16. The terminal device according to claim 15, wherein the processing circuitry is further configured to start acquiring a moving image of the user, including the plurality of images, in a case that a voice is acquired as the user information after the display of the one-time use password.

17. The terminal device according to claim 14, wherein after recognizing the content of the sound data, the processing circuitry extracts the face image from the plurality of images of the face of the user.

18. The terminal device according to claim 17, wherein the processing circuitry extracts a different face image captured at a timing of each sub-part of the plurality of sub-parts of the sound data.

19. The terminal device according to claim 18, wherein the authentication information includes one or more face images of the user.

\* \* \* \* \*